Patented Sept. 20, 1932

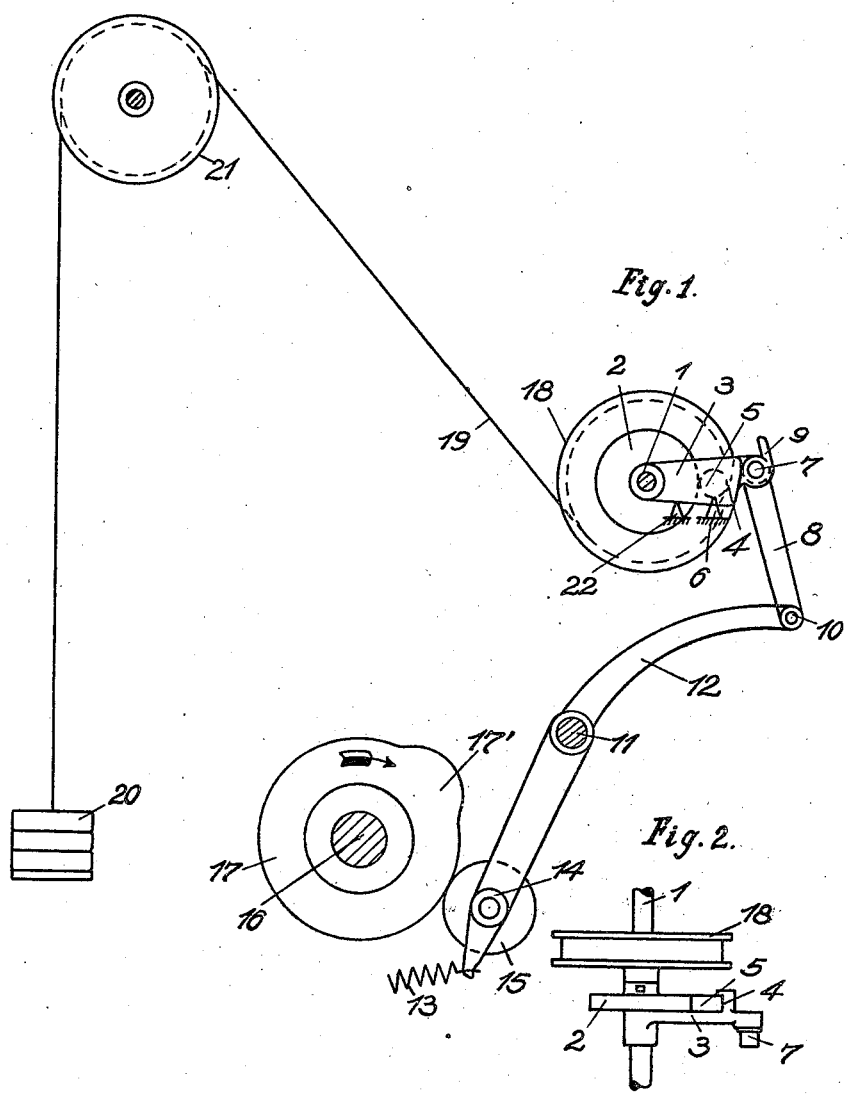

1,878,868

UNITED STATES PATENT OFFICE

KARL WILLI LIEBERKNECHT, OF OBERLUNGWITZ, GERMANY

DEVICE FOR THE TAKING-UP SHAFT OF FLAT HOSIERY FRAMES

Application filed June 11, 1931, Serial No. 543,649, and in Germany June 13, 1930.

This invention relates to a drive for the taking up shaft on flat hosiery frames, which is turned continually in one direction by weight so that the hosiery is kept under suitable tension, and it has for its object to remove the weight taking up at certain periods of an operation. Hitherto a rack or a push rod was brought into engagement with a toothed wheel provided with suitable thrust teeth at each of the required periods. In this drive however, the toothed wheel and rack were subject to heavy wear, as the teeth slide the one over the other during the return movement. The rotary movement of the taking up shaft is also irregular in the different pushes, as it is dependent upon the position of the pitch of the toothed wheel relative to the engaging point of the push rod.

The object of the invention is, to render the drive for the taking up shaft as regular as possible and particularly soft so as to reduce to a minimum the wear of the parts moving one over the other. This is attained according to the invention in that, for periodically removing the tension in the fabric, a control lever exerts a blocking and locking effect on the taking up shaft by means of a friction locking device, and this shaft is subsequently rotated in the direction opposite to the direction of rotation caused by the taking up weights.

An embodiment of the invention is illustrated by way of example in the accompanying drawing in which:

Fig. 1 shows the driving gearing in side elevation,

Fig. 2 being a part top plan view of Fig. 1.

The taking up shaft is designated by 1. It carries a disc 2 keyed thereon and a lever 3 loosely mounted beside the disc 2, an eccentric cam or inclined surface 4 being provided on the side of the free end of the lever 3 and projects over the disc 2. Between the disc 2 and the cam 4 a friction roller 5 is loosely mounted, which normally bears against a stationary stop 6. The lever 3 carries at its end a pin 7 for the engagement of the control. This is effected with the aid of a thrust rod 8, embracing the pin 7 with its free bifurcated end 9, whereas the other end is linked by means of a pin 10 to a two-armed lever 12, oscillatably mounted on a pivot 11.

The lower end of the two-armed lever 12, acted upon by a spring 13, carries on a transverse pin 14 a pressure roller 15 which runs on the circumference of a cam disc 17 keyed on a shaft 16.

On the shaft 1 a rope pulley 18 is keyed in known manner at the side of the disc 2. A pull rope 19, loaded by a weight 20, runs over this pulley 18 and over a guide pulley 21.

The operation is as follows:

If the lever 3 is lifted out of its normal position by the protuberance 17' of the cam disc 17 through the intermediary of the thrust rod 8, the roller 5 wedges between the disc 2 and the cam 4 and, through the intermediary of the blocked pulley 5, rotates the shaft 1 in opposition to the action of the weight 20.

If the thrust rod 8 together with the lever 3 returns into its initial position, the blocking of the disc 2 ceases and the roller 5, which may evidently be replaced by some other friction element, slides or runs on the disc 2 without any effect. If the roller 5 rests on the stationary stop 6, the shaft 7 is under the action of the taking up weight as before. It is advisable to provide a second stationary stop 22 for supporting the lever 3 so that the trust rod 8 can descend independently a greater distance and become absolutely free so as to enable same to be swung out, if desired.

I claim:

1. A flat hosiery frame in conjunction with a driving mechanism for the taking up shaft for the fabric, comprising in combination with the taking up shaft, a pulley keyed on said taking up shaft, a weight loaded pull rope connected to said pulley adapted to turn said shaft to put the fabric under tension, a disc keyed on said shaft, a lever loosely mounted on said shaft, a projection on the inner side of said lever having an inclined cam surface bearing against said disc, a pin on the outer side of said lever, and means engaging said lever adapted to block said driving shaft.

2. On a flat hosiery frame the arrangement of a driving mechanism for the taking up shaft for the fabric, comprising in combination with the taking up shaft, a pulley keyed on said shaft, a weighted pull rope connected to said pulley adapted to turn said shaft to put the fabric under tension, a disc keyed on said shaft, a lever loosely mounted on said shaft, a rigid projection on the inner side of said lever having a cam surface inclined relative to said disc, a blocking element for said shaft resting loosely against said disc and said cam surface, a pin rigidly mounted on the outer side of said lever, a thrust rod cooperating with said pin, a rod system connected to said thrust rod, a cam acting on said rod system adapted to control said thrust rod to lift said thrust rod and rotate said taking up shaft against the action of said weighted pull rope, and rigid supporting abutments for said lever and said blocking element.

In testimony whereof I affix my signature.

KARL WILLI LIEBERKNECHT.